United States Patent [19]

Gazda

[11] 3,738,116
[45] June 12, 1973

[54] COMPRESSOR UNLOADER INDICATOR AND REFRIGERATION SYSTEM CONTROLLED THEREBY

[75] Inventor: Edward S. Gazda, Suffield, Conn.
[73] Assignee: Dunham-Bush, Inc., West Hartford, Conn.
[22] Filed: Oct. 1, 1971
[21] Appl. No.: 185,618

[52] U.S. Cl. .................. 62/131, 62/196, 335/205, 200/81.9, 116/114
[51] Int. Cl. ... F25b 49/00, G01d 13/00, H01h 3/00
[58] Field of Search .................. 62/126, 129, 131, 62/510, 196; 335/207, 82; 200/81, 9 M, 56; 415/118; 116/114 K; 92/5 R; 91/1; 417/505, 63, 297; 73/307, 308, 313, 314

[56] References Cited
UNITED STATES PATENTS

| 3,678,750 | 7/1972 | Di Noih | 73/313 |
| 3,639,868 | 2/1972 | Gasper et al | 200/81.9 M |
| 3,548,659 | 12/1970 | Ellis | 73/314 |
| 3,408,828 | 11/1968 | Soumerai et al | 62/193 |
| 3,408,826 | 11/1968 | Soumerai et al | 62/193 |
| 3,402,270 | 9/1968 | Lathrop | 335/207 |
| 2,446,657 | 10/1948 | MacLead et al | 92/5 R |

FOREIGN PATENTS OR APPLICATIONS

| 1,177,932 | 1/1970 | Great Britain | 200/81.9 M |
| 1,103,118 | 2/1968 | Great Britain | 335/205 |

Primary Examiner—William F. O'Dea
Assistant Examiner—Paul Devinsky
Attorney—Richard C. Sughrue, John H. Mion and Donald E. Zinn et al.

[57] ABSTRACT

A fluid motor operates a reciprocating slide valve for unloading a screw type compressor. The reciprocating valve has a rod extending therefrom exterior of the motor housing which reciprocates within a cylindrical inner tube formed of non-magnetic material. A permanent magnet is affixed to the end of the rod, and a ring-shaped magnetic follower slides freely on the outside of the inner tube and follows the permanent magnet on the rod by magnetic attraction between the same. A larger diameter outer tube concentrically surrounds the inner tube and is spaced slightly therefrom. A clear transparent window on the outer tube allows viewing of the follower while a scale permanently fastened to the outer tube indicates the relative load-unload position of the compressor slide valve. Longitudinal grooves within the outer tube carry at spaced locations multiple groups of reed switches which are electrically coupled to the refrigeration control system. These switches are responsive to the position of the follower to control one or emore valves which in turn control the refrigerant flowing through the refrigeration system.

8 Claims, 5 Drawing Figures

INVENTOR
EDWARD S. GAZDA

COMPRESSOR UNLOADER INDICATOR AND REFRIGERATION SYSTEM CONTROLLED THEREBY

BACKGROUND OF THE INVENTION

Reference to Related Patent

This invention is an improvement in refrigeration system set forth in U. S. Pat. No. 3,408,827 to Henri Soumerai et al. patented Nov. 6, 1968, and assigned to the common assignee.

Field of the Invention

This invention relates to a screw type compressor refrigeration system and more particularly to an unloader indicator and control means associated therewith for controlling operation of the refrigeration system in response to the load-unload condition of the screw type compressor.

The prior art, as examplified by the referred to patent, constitutes a refrigeration system which includes a screw compressor having an unloader. The compressor directs compressed refrigerant gas to a water cooled condenser. A liquid refrigerant line leads from the condenser via a heat exchange which acts as a super heater unit to a liquid refrigerant dryer-filter and through a liquid supply control assembly to an evaporator-chiller, where-by, in turn, a gas refrigerant return line directs the vaporized refrigerant gas from the chiller to the input side of the screw compressor.

The system further incorporates an oil circulating system for cooling the compressor and the electric motor, and for providing pressurized hydraulic liquid to operate the fluid motor which effects reciprocation of the unloader valve of the screw type compressor. Operation of the unloader slide valve is such that it slides from right to left to expose an opening in the bottom of the rotor casing through which the suction gas may return from the central portion of the compressor to the suction inlet varying the capacity of the compressor.

With regard to the circulation of refrigerant through the system, a hot gas bypass line extends from the gas refrigerant discharge side of the compressor to the inlet side of the evaporator-chiller, bypassing the condenser. A solenoid operated valve is positioned within this line which acts as the cut off and is opened to supply hot gas under the control of a restrictor in series with the same to prevent stratification of the liquid phase and unstable operation of the refrigerant control. For example, at low loads, there is a tendency for the liquid refrigerant to flow only through certain of the evaporator tubes and this condition is corrected by opening a solenoid valve so that the hot refrigerant gas flows with the liquid refrigerant through a header of the evaporatior-chiller and through the distributor lines to the various chambers and thus the tubes of the evaporator-chiller. The amount of hot gas is controlled by the restrictor valve so as to insure continuous flow of the refrigerant through the evaporator tubes.

The system further includes a pair of fluid control valves coupled in parallel for controlling the flow of liquid refrigerant from the super heater heat exchanger to the chiller-evaporator. A first valve is fully closed at low loads, for example, below 35 percent of full load. The second valve then determines the supply of liquid refrigerant to the header of the chiller-evaporator below 35 percent of full load. However, at loads above 35 percent of full load, this second valve is fully open and control is then exerted by the first valve. In particular, the referred to patent relates specifically to a control unit operated in response to positioning of the slide valve with the screw type compressor for indicating the load-unload condition of the compressor and a plurality of cam operated switches for effecting operation respectivey of the bypass solenoid operated control valve and one of the pair of control valves feeding high pressure liquid refrigerant from the super heater to the chiller-evaporator. A spring biased rotatable reel is cable coupled to the piston of the fluid motor controlling the slide valve with the reel in turn controlling a variable resistor providing an electrical output indicative of compressor unloader slide valve position. Further, rotatable cams driven by the reel operate sequentially to close a normally open switch and open a normally closed switch for controlling, in turn, a solenoid operated bypass valve and the liquid refrigerant control valve which determines the amount of liquid refrigerant being supplied to the chiller-evaporator header.

While the system operates satisfactorily in terms of control, there is no readily viewed instantaneous indicator of unloader slide position and the forces operating on the slide valve must be transformed from reciprocating to rotary motion to effect both operation of the switches and an indication of valve position.

SUMMARY OF THE INVENTION

The present invention is directed to an improvement in the unloader indicator for the screw-type compressor employed in such a refrigeration system. The unloader indicator of the invention constitutes a rod which reciprocates in response to movement of the slide valve and is positioned within a fixed concentric non-magnetic tube. The rod carries a permanent magnet and the concentric tube supports a magnetic follower which is slidably mounted on the tube in concentric fashion for freely sliding axially on the same, but constrained to follow the magnet due to the magnetic attraction between the follower and the permanent magnet fixed to the reciprocating rod. The position of the follower, therefore, is indicative of the position of the slide valve.

A second, outer fixed tube concentrically surrounds and is spaced from the magnetic follower with at least a portion of the outer tube being transparent to allow ready viewing of the follower. An indicator scale is fixedly carried by the outer tube to clearly indicate the exact position of the unloader slide valve. A plurality of reed switches are operatively coupled, through holding relays, to the solenoid operated valves associated with the hot gas bypass circuit and the liquid refrigerant feed from the super heater to the chiller-evaporator for controlling operation of the flow of refrigerant to the system. Each of the reed switches are caused to close when the permanent magnet passes in the vicinity of the switch. Preferably, longitudinal grooves are formed within the outer tube and the reed switches form axially shiftable units positioned within the grooves. This permits operation of the solenoid operated valves through individual holding relays, the axial spacing of the reed switches for each unit being such as to prevent the holding relays from cycling during minor axial shifting of the compressor unloading valve and the unloader indicator rod.

DESCRIPTION OF THE PREFERRED EMBODIMENT

Figure 1:
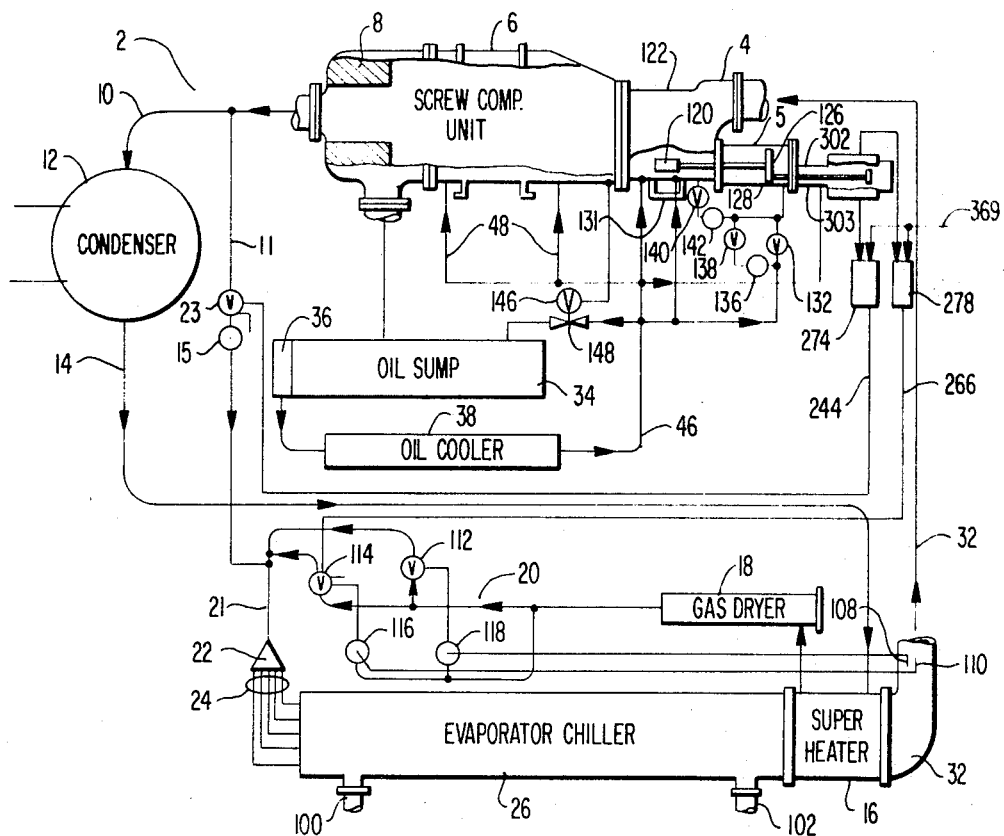
FIG. 1 is a schematic view of a refrigeration system incorporating the improved compressor unloader indicator and control system of the present invention.

The illustrated refrigeration system of FIG. 1 is to a large extent identical to that of FIG. 1 of the referred to U.S. Pat. No. 3,408,827, and like elements will be given like numerical designations. The principal component of the refrigeration system 2 comprises a screw compressor 4 having an unloader 5, the screw compressor 4 being driven by an electric motor 6 and being provided with oil separator 8, components 4, 5, 6 and 8 defining a unit which acts to discharge compressed refrigerant gas through line 10 to the water cooled condenser 12. A liquid refrigerant line 14 extends from the condenser to the heat exchanger unit 16 which acts as a super heater unit. The high pressure liquid refrigerant exits from the super heater and is directed to a liquid refrigerant dryer-filter 18 and from there through a liquid supply control assembly 20 to a distributor header 22 and via a plurality of liquid distributor tubes 24 to an evaporator-chiller 26. A gas refrigerant return line 32 returns the gas to the inlet end of screw compressor 4.

The elements as thus described are identical to that of the prior patent and constitute in general terms, the system components necessary for proper operation of the refrigeration system to which the present invention is directed.

Of particular importance to the present invention, is the use of a hot gas bypass line 11 which is connected between the gas refrigerant discharge line 10 and the liquid supply line 21 with directs liquid refrigerant from the liquid supply control assembly 20 to the evaporator-chiller 26. Line 11 includes a cut-off solenoid valve 23 and a fluid restrictor 15. The valve 23 is open to supply hot gas under the control of restrictor 15, to prevent stratification of the liquid phase and unstable operation of the refrigerant control. The hot gas, under the control of the restrictor valve 15 insures continuous flow of the refrigerant through the evaporator tubes 24.

Of further importance to the present invention are valves 112 and 114, under the control of two control bulbs 108 and 110 within return line 32. The control bulbs 108 and 110 are temperature sensitive and control the liquid supply or regulator valves 112 and 114 respectively through controllers 116 and 118. In the illustrated embodiment, valves 112 and 114 are situated in parallel and valve 114 is fully closed at low loads, for example, below 35 percent of full load, while valve 112 determines the supply of liquid refrigerant to header 22 below 35 percent of full load. At loads above 35 percent of full load, valve 112 is fully open and all of the control is exerted by valve 114. It is to this control of valve 114 that the invention is further directed.

While the full operation of the system is more fully described in the referred to patent, briefly, the multiple evaporator tubes within the evaporator-chiller 26 act as indivdual or separate evaporators to effect maximum cooling of the water or other liquid to be cooled which flows to and from the evaporator shell through a pair of lines 100 and 102. The gas evolving by expansion in the evaporator-chiller returns to the compressor inlet through gas return line 32 during operation the unloader 5 which controls the operation of the compressor to vary its capacity and thereby compress the amount of refrigerant required for the load at all times. The capacity control or unloader slide valve 120 which is shown in its full-load position forms a portion of the compressor rotor casing 122 and slides to the left of the position shown to thereby expose an opening in the bottom of the rotor casing through which the suction gas can pass back from the central portion of the compressor to the suction inlet via return tube 131. Controlled shifting of the slide valve is achieved by supplying oil under pressure to valves 132, 136, 138, 140 and 142. In addition, the system includes a pressure relief valve comprised of a control unit 146 and valve 148 to maintain the pressure in line 46 dependent upon the pressure within the compressor 4. The system as described to this point is fully set forth in the referred to patent and reference may be had thereto for details as the operation of the same.

The present invention provides for a more accurate and dependable control of the movement of the unloader piston and slide with simplification both in the structure of the same and the switch system in conjunction therewith. Mounted upon and closing the right end of cylinder 128 is a retainer plate 301 which is clamped in place by a plurality of stud bolts (not shown). Threaded to retainer plate 301 is a fabricated non-magnetic guide tube 302, the tube incorporating a tapered cylindrical fitting 350 having a threaded outer surface 352 engaging threaded bore 354 of the retainer plate 301. Fastened to piston 126 is one end of a rod 303, the rod extending outwardly of the casing and coaxially positioned within the fixed guide tube 302. It is noted that oil is selectively directed to opposite faces of the piston 126 to reciprocate the same in either direction and in this case, oil may readily fill the cavity of the inner guide tube 302 and actually surround the rod 303. The outer end of rod 303 carries a guide washer 304 of a diameter slightly less than the inner diameter of the guide tube 302. With the guide washer 304, a cylindrical mounted magnet 305 and a flat washer 306 are coupled to the rod 303 by means of screw 307. Hence, as the piston 126 moves back and forth during the loading and unloading of the compressor, it is followed by like movement of the cylindrical permanent magnet 305. As stated differently, the position of magnet 305 enjoys a definite positive relationship to the position of the piston 126 and thus the loading of compressor 4.

Attached to the outer circumference of the guide tube 302 is an indicator assembly 308. The indicator assembly 308 consists of an outer cylindrical tube 310 formed preferably of PVC (polyvinyl chloride) which is somewhat larger in diameter than the inner guide tube 302. Cylindrical PVC end caps 311 and 313 embrace the ends of the outer tube 310 and by means of set screws 312 the axailly shiftable indicator assembly 308 is preset at a given axial position along the length of the guide tube 302. Captured between the inner and outer tubes 302 and 310 respectively is a slidably mounted, cylindrical follower 309 which preferably is a permanent magnet which is freed to move over the outer circumference of the inner guide tube 302 but is limited in axial movement by end caps 311 and 313. The set screws 314 maintain the position of the outer tube 310 with respect to end caps 313, while in turn, set screws 312 allow the indicator assembly to be fixed both in axial and radial position with respect to the fixed inner guide tube 302.

Figure 4:
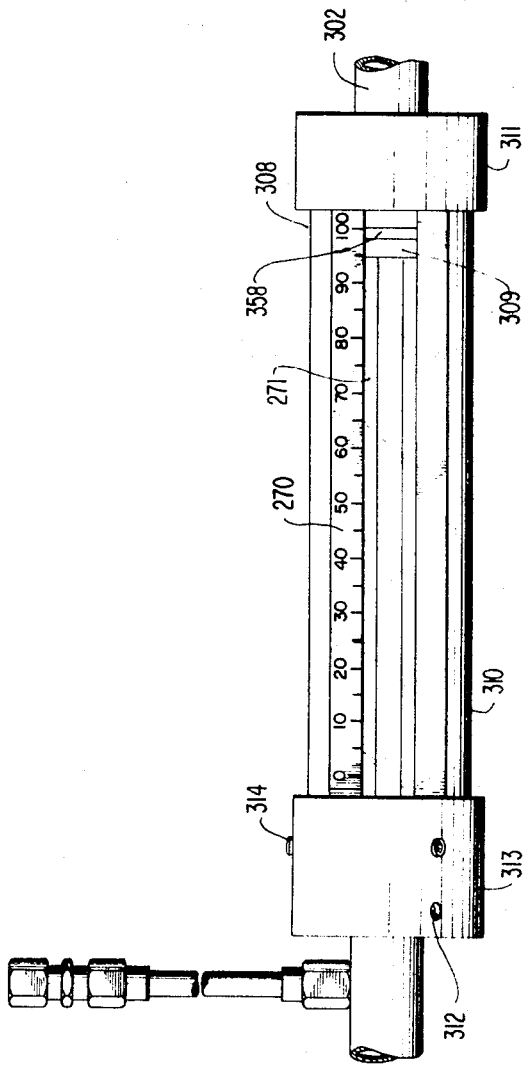
FIG. 4 is a side elevational view of the same indicator of FIG. 2.

As illustrated in FIG. 4, the polyvinyl chloride outer tube 310 includes a transparent window 271 which in turn is provided with a scale 270 with the length of the same corresponding to the axail travel of the piston 126 and providing a definite indication of the loading of the compressor. In operation, the loading and unloading of the compressor 4 by movement of piston 126, simultaneously moves the rod 303 and the inner magnet 305 which causes the follower, that is, the outer magnet 309 due to magnetic coupling, to shift axially and to follow the same accurately, thereby giving visual indication of the compressor loading and unloading. The moveable follower 309 is isolated from the hydraulic oil which operates piston 126 by means of the seals provided by threaded fitting 350 and the end plug 356 at the outer end of the fixed tube 302. The permanent magnet follower constitutes a cylinder having a raised and preferably painted circular ridge 358 used to more readily and accurately indicate the exact position of the follower with respect to the scale 270.

As indicated in the above referenced patent, operation of valves 23 and 114 depend upon the load condition of the compressor. For example, a switch, responsive to the position of the unloader, energizes or de-energizes a solenoid to cause the valve 23 to close or open. It is a requirement of the system that the switches be capable of operating to cause the opening of valve 23 at one position of the slide valve 120 during unloading and to cause the closing of the valve at another position of the slide valve duringthe loading of the compressor. The opening and closing of the valve is regulated according to the operating conditions of the system. Similar provisions must be made for the operation of valve 114. That is, unloader 5 and the indicator follower must operate to cause valve 114 to open at one slide valve position during loading and to close at another slide valve position during unloading. For example, valve 114 may be required to be opened when slide valve 120 moves from its unloaded position to 33 percent of the travel distance from the unloaded position toward the fully loaded position whereas it may be required that this valve not close until the slide has moved to a position which is 26 percent of the travel from the fully unloaded position.

To provide the necessary control of the opening and closing of valves 23 and 114 in response to the movement of slide 120 as indicated by a corresponding movement of rod 303 and magnet 305, the unloader indicator of this invention is provided with grooves formed longitudinally along the outer tube 310. Within these grooves are selectively positioned switches which are preferably reed switches activated by the radially extending magnetic field of the magnet 305 and the follower 309 when the magnets pass in the vicinity of the switches.

Figure 3:
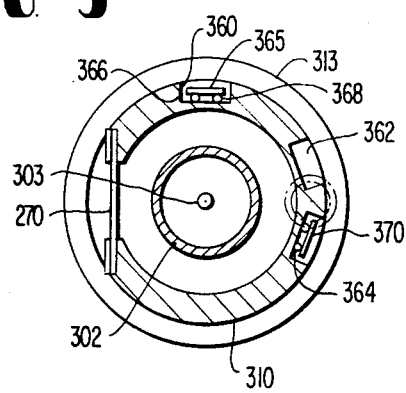
FIG. 3 is a sectional view of the indicator taken about line 3—3 of FIG. 2.
Figure 5:
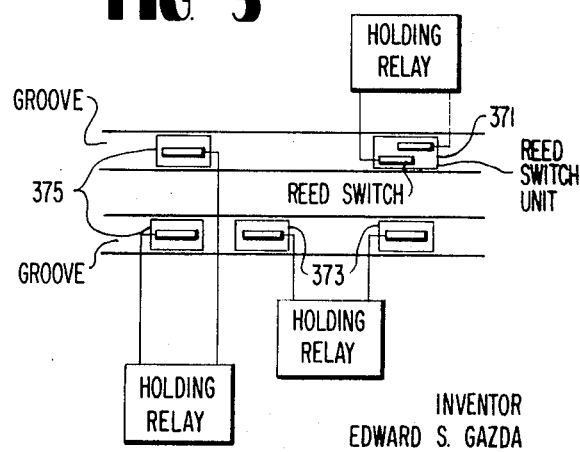
FIG. 5 is a schematic diagram showing possible arrangements for reed switch pairs associated with the holding relays.
Figure 2:
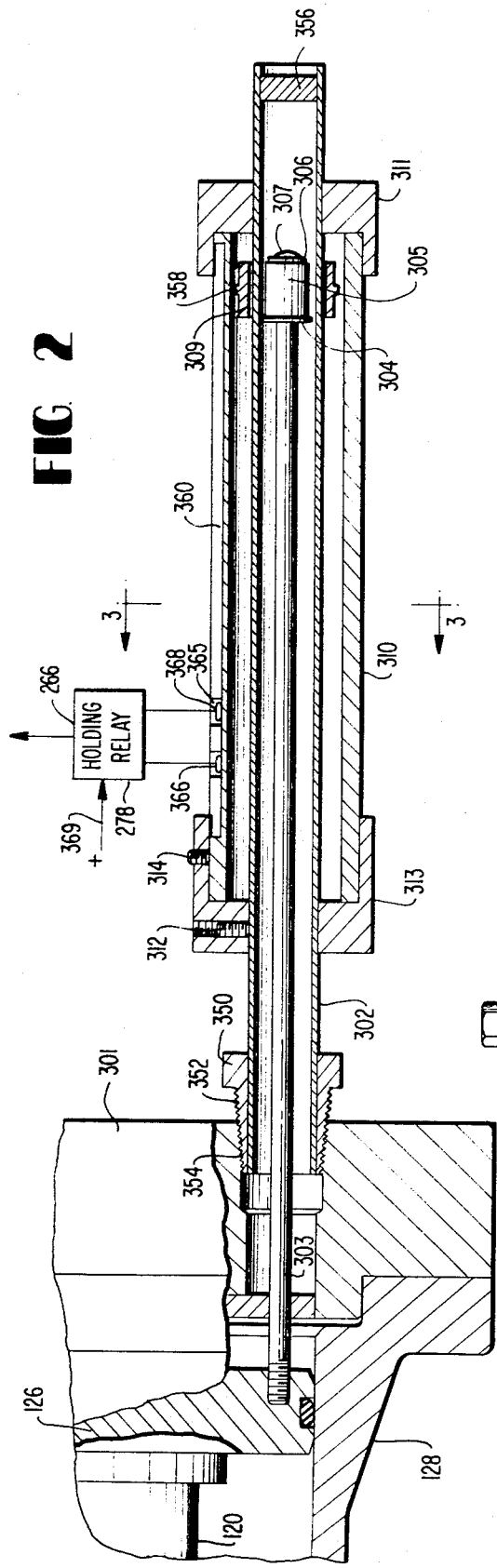
FIG. 2 is an enlarged view of a portion of the screw compressor unit of FIG. 1 partially in section illustrating the unloader indicator of the present invention.

With reference to FIGS. 2 and 3, grooves 360, 362 and 364 are positioned longitudinally along the outer surface of tube 310. Reed switch units such as at 365, each comprised of either one or two reed switches mounted on a suitable base, are selectively placed in the grooves. A unit may comprise two switches offet from each other as shown at 371 of FIG. 5 when the valve with which it is associated opens and closes at essentially the same slide valve position. However, if operating conditions reqiure a relatively large displacement between the switches two units may be used situated in the same groove, each carrying one switch as illustrated at 373 in FIG. 5. These units are made slideable within the grooves so that their positions relative to scale 270 are made variable. FIG. 5 is a schematic diagram showing a number of possible arrangements for the reed switch pairs which control the operation of the valves through holding relays. The manner in which the valves are controlled is set forth in detail below. The arrangement shown at 375 may be used instead of the arrangemnts shown at 371 and 373. In this arrangement two units are used each containing a single switch, the two units being positioned in different grooves.

The solenoid valves 23 and 114 are each coupled to a respective pair of reed switches through a holding relay. For example, switches 366 and 368 formed on different switch units, are positioned at different axial locations in groove 360 and are coupled to a holding relay 278. Other switch units are positioned at given longitudinal positions within grooves 362 and 364, such as reed switch unit 370 within groove 364. The output relay is coupled via line 266 to the solenoid valve 114.

Operation of this portion of the system will now be described. The holding relay 278 operates to connecte electrical power supplied by line 369 to the solenoid of valve 114 in response to the momentary closing of a start or set switch which may be either of the reed switches. The relay holds this state until a stop or reset switch is momentarily closed. Closing of the stop switch causes the relay to blcok further power from entering the solenoid of valve 114. The relay remains in this reset state until the next closing of the start switch. Relays operating in this manner are conventional. An example of relays which may be used with this invention are the GEMS holding relays model numbers 28169 and 28244, manufactured by the GEMS Division of the DeLaval Turbine Company.

With the slide valve 120 in its fully unloaded position, magnet 305 is at the left end of tube 302. As the slide valve 120 moves to its loaded position, the magnet 305, as controlled by rod 303 moves to the right. Assuming the valve 114 is to be closed, that is, the relay is to block electrical power from valve 114, until the magnet 305 has moved 33 percent of the travel distance between the unloaded and loaded position starting from the unloaded end, reed switch 368 of unit 365 operates as the start switch for relay 278 by coupling it to the start or set terminals thereof. That is, assuming a closed valve corresponds to a de-energized solenoid which in turn corresponds to a relay in its blocking state, the valve is not opened until the magnet 305 has moved from its fully unloaded position to 33 percent of its travel toward the fully loaded position. Switch 366 then corresponds to the stop or reset switch and is coupled to the stop terminals of the relay. This switch is located at a position in groove 360 corresponding to 26 percent of the travel between the fully unloaded and fully loaded positions. Thus, the relay continues to provide a path for the flow of electrical power to the solenoid of valve 114 until the magnet 305 has moved, during the unloading operation, to a position corresponding to 26% of the travel from the fully unloaded position to the fully loaded position. Closing of switch 368 during unloading has no affect on the condition of valve 114 since the relay is being held in its set state, thus providing a path for power to flow to the valve 114. Similarly, when the magnet 305 moves from its fully unloaded position past the switch 366 during loading no change in valve operation occurs since during unloading, the relay was placed in its reset state. However, when magnet 305 reaches the 33 percent travel point corresponding to the position of switch 368 the relay switches its state to energize the solenoid of valve 114 to cause it to open.

The switches located in groove 364 such as the switch on unit 370 are coupled to holding relay 274 which is connected via line 244 to solenoid valve 23. Operation of these switches are relay 274 are identical to the operation of switches 366 and 368 and relay 278, and in conformance with the previously referred to patent.

While the invention has been particularly shown and described with reference to a preferred embodiment thereof, it will be understood by those skilled in the art that various changes in form and details may be made therein without departing from the spirit and scope of the invention.

What is claimed is:

1. In a refrigeration system including a screw compressor having an axially shiftable unloader slide for varying the capacity of the ocmpressor, the improvement comprising:
   a first non-magnetic tube fixed to said compressor,
   an axially slidable rod operatively coupled to said unloader slide and slidably positioned within said tube,
   a permanent magnet mounted on said rod for axail movement therewith within said tube,
   a cylindrical magnetic follower concentrically disposed on said tube and freely slidably axially thereof to indicate the position of the unloader slide,
   control means including solenoid valve means for controlling refrigerant flow,
   a second outer tube concentrically surrounding said first tube and spaced from said first tube and said follower, and
   at least one switch means carried by said outer tube in the path of the magnetic flux emanating from said permanent magnet and connected to said solenoid valve means,
   whereby, movement of the permanent magnet in the vicinity of said switch means changes the state of said switch means to vary refrigerant flow.

2. The refrigeration system as claimed in claim 1, wherein said switch means includes at least one reed switch and the outer periphery of said outer tube carries a longitudinally extending groove receiving said at least one reed switch.

3. The refrigeration system as claimed in claim 1, wherein siad outer tube includes at least a portion thereof which is relatively transparent, said cylindrical follower includes an annular indicator ridge on the outer surface thereof and said outer tube further carries a fixed indicator scale to accurately indicate the exact position of the unloader slide.

4. The refrigeration system as claimed in claim 2 wherein said outer tube carries a plurality of longitudinally extending circumferentially spaced grooves each receiving at least one reed switch threby permitting individual reed switches to be axially overlapped.

5. The refrigeration system as claimed in claim 4 wherein said switch means comprises a holding relay and a pair of reed switches coupled to said relay, said pair of reed switches being receiving in pne of said grooves, said holding relay being coupled to said valve means.

6. In combination, a screw type compressor having an axially shiftable unloader slide for varying the capacity of the compressor,
   means constituting with said compressor a complete refrigeration system including an evaporator,
   operating means to move said unloader slide through the operating range,
   liquid refrigerant supply means to control the supply of refrigerant to the evaporator and including a plurality of restrictor means in parallel,
   auxiliary control means to stop of flow of refrigerant through one of said restrictor means at a compressor load below a predetermined value, said auxiliary control means including:
   individual solenoid operated valves,
   an unloader indicator comprising an axially slidable rod operatively coupled to said unloader slide with movement of the same corresponding to that of said unloader slide, a non-magnetic tube concentrically surrounding said axially slidable rod and fixed to said compressor, a permanent magnet mounted on said rod for axial movement therewith within said tube, a cylindrical magnetic follower disposed concentrically on said tube and freely slidable axially thereof but constrained to follow said permanent magnet, a second outer tube concentrically surrounding said first tube and spaced from said tube and said follower, and
   reed switches forming part of said auxiliary control means carried by said outer tube and capable of having their state changed during longitudinal movement of said permanent magnet to selectively control operation of said solenoid valves to stop the flow of refrigerant through one of said restrictor means at compressor loads below a predetermined value.

7. The refrigeration system as claimed in claim 6 wherein said control means further comprise pairs of reed switches carried by said outer tube, holding relay means operated in response to proper sequential operation of each pair of reed swtiches and connected between said reed switches and said solenoid operated valve with at least one relay and one pair of reed switches forming a portion of the auxiliary control means causing stoppage of flow of refrigerant through one of said restrictor means at compressor loads below a predetermined value.

8. The refrigeration system as claimed in claim 7 further comprising hot gas supply means to supply hot gas at a controlled rate from said compressor to the stream of liquid flowing from the restrictor means to said evaporator and control means for said hot gas supply means responsive to the load condition on said compressor for shutting off said hot gas supply throughout the load condition between full load condition and a predetermined partial load condition, said control means further comprising a second pair of reed switches carried by said outer tube and operatively connected through a second relay to said hot gas supply means.

* * * * *